G. BORMANN.
RUBBER HEEL.
APPLICATION FILED MAR. 8, 1922.
1,429,673. Patented Sept. 19, 1922.
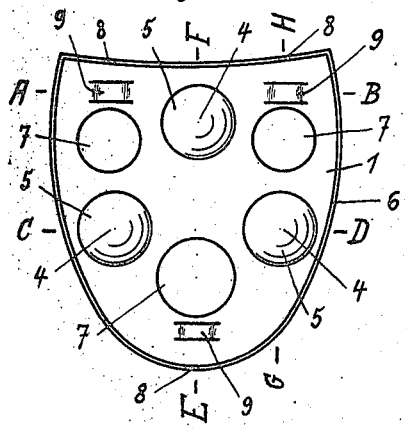
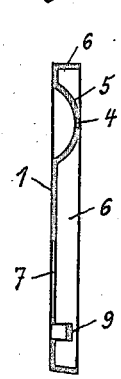
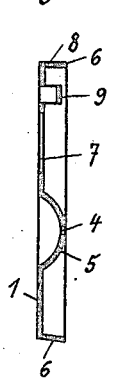
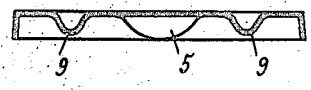
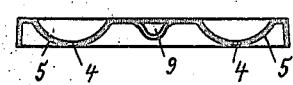
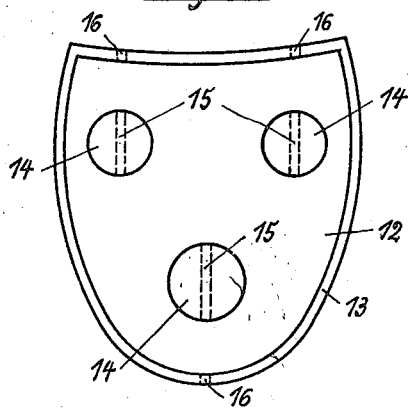
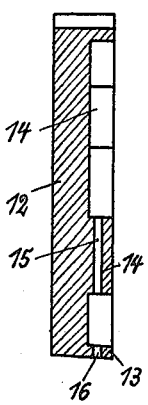
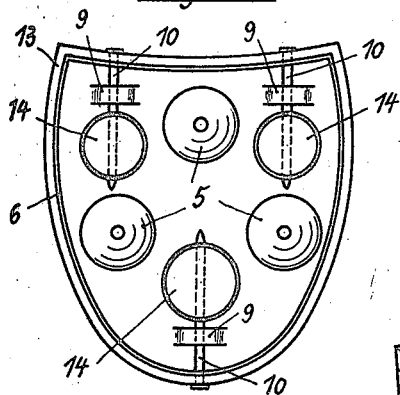
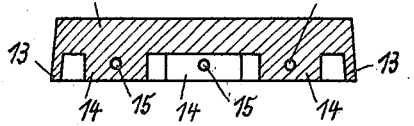
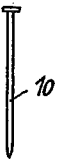
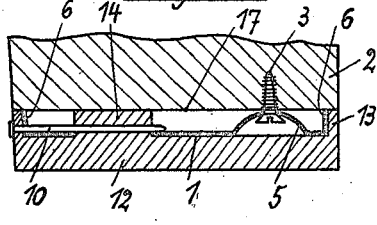
Inventor
Gustav Bormann
By [signature]
Attorney.

Patented Sept. 19, 1922.

1,429,673

UNITED STATES PATENT OFFICE.

GUSTAV BORMANN, OF HANOVER, GERMANY.

RUBBER HEEL.

Application filed March 3, 1922. Serial No. 542,192.

*To all whom it may concern:*

Be it known that I, GUSTAV BORMANN, a citizen of Germany, residing at 33 Ferdinand-Wallbrechstrasse, Hanover, Germany, have invented certain new and useful Improvements in Rubber Heels, of which the following is a specification.

My invention refers to rubber taps for the heels of boots and shoes and more especially to an article of the kind aforesaid to be fixed to the heel by aid of a flanged metal plate. Its particular object is to ensure a better and easier fit for the tap.

To this end the rubber tap, whose projecting rim surrounds the metal plate, is provided with a number of projections adapted to be introduced in indentures or holes arranged in the plate, whose projecting rim rests against the lower side of the heel piece, bulged portions being provided with holes for the fastening screws.

Intermediate the plate rim and the holes or indentures there are provided in the metal plate eyes formed by punching and which serve for guiding the wire nails designed to fix the tap to the metal plate.

In the drawings affixed to this specification and forming part thereof a rubber tap and metal plate embodying my invention are illustrated diagrammatically by way of example. In the drawings Fig. 1 is a plan view and Figs. 2 to 5 are cross sections of the metal plate on the lines A—B, C—D, E—F, and G—H in Fig. 1, respectively.

Fig. 6 is a plan view,

Fig. 7 a longitudinal section and

Fig. 8 a cross-section of the rubber tap.

Fig. 9 shows a wire rail.

Fig. 10 is a plan view of the metal plate with the rubber tap fastened to it, and Fig. 11 is a longitudinal section of the heel piece with the plate and tap fixed thereon.

Referring to the drawings 1 is the flanged metal plate 1 formed circumferentially like the heel piece 2 but being a little smaller. The plate is fastened to the heel piece by aid of screws 3 passing through holes 4 provided in bulged portions 5 of the plate. The circumferential flange 6 of the plate rests against the lower side of the heel piece. Round holes 7 are provided in the plate in line with holes 8 in the flange 6. Eyes are formed by punching in the portions of the plate intermediate the holes 7 and 8, wire nails extending through the holes 8 and eyes 9 serving to fix the tap to the plate.

The rubber tap 12 has a circumferentially projecting rim 13 and a number of projections 14 formed with holes 15 extending through their bases, similar holes 16 being provided in the rim in line with the holes 15.

In assembling the several parts the rubber tap 12 is placed on the metal plate 1 with its rim 13 surrunding the plate and closely following the outline of the heel piece. The plate is fixed on the heel piece 2 by means of screws 3 extending through the holes 4. The projections 14 on the rubber tap fit snugly in the holes 7 of the plate. The wire nails 10 are then passed through the holes 16 in the rim 13 of the tap, through the holes 8 in the flange of the plate, the eyes 9 and thereafter through the holes 15 in the projections 14. The nails are preferably proportioned to fit snugly in the holes, being held therein by friction.

Although in the example illustrated three projections 14 and holes 7 are provided, their number may vary and in the case of narrow heels for ladies shoes a single projection 14 on the rubber tap and a single hole 7 in the plate may suffice.

The several bulged portions 5 may be replaced by a single large portion of similar form.

I wish it to be understood that I do not desire to be limited to the exact details of construction shown and described, for obvious modifications will occur to a person skilled in the art.

I claim:

1. A device of the kind described comprising in combination, a flanged metal plate having openings adapted to rest with its flange from below against a heel piece, a bulged portion in said plate provided with a hole for the passage of fastening means, a flanged rubber tap adapted to rest on and to surround said plate and a projection on said tap constructed and arranged to fit into said openings of said plate.

2. A device of the kind described comprising in combination, a flanged metal plate having openings adapted to rest with its flange from below against a heel piece, a bulged portion in said plate provided with a hole for the passage of fastening means, a flanged rubber tap adapted to rest on and to surround said plate, a projection on said tap constructed and arranged to fit into said openings of said plate and punched eyes on said plate intermediate said bulged portions and holes provided in the rim flanges of said tap and plate, respectively, said eyes and holes serving to receive the means for securing said tap to said plate.

In testimony whereof I affix my signature.

GUSTAV BORMANN.